US012694281B2

(12) United States Patent
Cherubini et al.

(10) Patent No.: US 12,694,281 B2
(45) Date of Patent: Jul. 28, 2026

(54) NEURAL NETWORK SYSTEMS FOR ABSTRACT REASONING

(71) Applicant: International Business Machines Corporation, Armonk, NY (US)

(72) Inventors: Giovanni Cherubini, Rueschlikon (CH); Hlynur Freyr Jonsson, Reykjavik (IS); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 17/036,124

(22) Filed: Sep. 29, 2020

(65) Prior Publication Data

US 2022/0101117 A1 Mar. 31, 2022

(51) Int. Cl.
*G06N 3/045* (2023.01)
*G06N 3/08* (2023.01)
(52) U.S. Cl.
CPC ............... *G06N 3/08* (2013.01); *G06N 3/045* (2023.01)
(58) Field of Classification Search
CPC .................................. G06N 3/08; G06N 3/045
See application file for complete search history.

(56) References Cited

U.S. PATENT DOCUMENTS

| | | | |
|---|---|---|---|
| 9,619,748 | B1 | 4/2017 | Commons et al. |
| 2016/0321522 | A1 | 11/2016 | Yuan et al. |
| 2019/0114549 | A1 | 4/2019 | Olsher |
| 2019/0258937 | A1 | 8/2019 | Alemi |

FOREIGN PATENT DOCUMENTS

| | | |
|---|---|---|
| CN | 1964356 A | 5/2007 |
| CN | 108304787 A | 7/2018 |
| CN | 114330470 A | 4/2022 |

(Continued)

OTHER PUBLICATIONS

Barrett, D., et al, Measuring abstract reasoning in neural networks, [received Jul. 14, 2023]. Retrieved from Internet :<http://proceedings.mlr.press/v80/barrett18a.html> (Year: 2018).*

(Continued)

*Primary Examiner* — Miranda M Huang

*Assistant Examiner* — Bart I Rylander

(74) *Attorney, Agent, or Firm* — Yee & Associates, P.C.

(57) ABSTRACT

A computer-implemented method, system, and computer program product to solve a cognitive task that includes learning abstract properties. One embodiment may comprise accessing datasets that characterize the abstract properties. The accessed datasets may then be inputted into a first neural network to generate first embeddings. Pairs of the first embeddings generated may be formed, which correspond to pairs of the datasets. Data corresponding to the pairs formed may then be inputted into a second neural network, which may be executed to generate second embeddings. The latter may capture relational properties of the pairs of the datasets. A third neural network may be subsequently executed, based on the second embeddings generated, to obtain output values. One or more abstract properties of the datasets are learned based on the output values obtained, in order to solve the cognitive task.

2 Claims, 4 Drawing Sheets

(56) References Cited

FOREIGN PATENT DOCUMENTS

| DE | 102021124252 A1 | 3/2022 |
| GB | 2600545 A | 5/2022 |
| JP | H0480890 A | 3/1992 |
| JP | 2019-509551 A | 4/2019 |
| JP | 2022056413 A | 4/2022 |
| KR | 10-2019-0059033 A | 5/2019 |
| WO | 2015/083199 A1 | 6/2015 |
| WO | 2017/136060 A1 | 8/2017 |
| WO | 2018/211143 A1 | 11/2018 |

OTHER PUBLICATIONS

Belghazi, M., et al, Mutual Information Neural Estimation, [received Jul. 14, 2023]. Retrieved from Internet :<https://proceedings.mlr.press/v80/belghazi18a.html> (Year: 2018).*

Hoshen, D., et al., The IQ of Neural Networks, [received Jul. 14, 2023]. Retrieved from Internet :<https://arxiv.org/abs/1710.01692> (Year: 2017).*

Lovett, A., et al, A Computational Model of the Visual Oddity Task, [received on Jul. 14, 2023]. Retrieved from Internet :<chrome-extension://efaidnbmnnnibpcajpcglclefindmkaj/https://escholarship.org/content/qt1fd220ht/qt1fd220ht.pdf> (Year: 2008).*

Paul, Av, Prediction of missing EEG channel waveform using LSTM, [received Jul. 14, 2023]. Retrieved from Internet :<Ihttps://ieeexplore.ieee.org/abstract/document/9080697> (Year: 2020).*

Santoro, A., et al, A simple neural network module for relational reasoning, [received on Jul. 14, 2023]. Retrieved from Internet: <https://proceedings.neurips.cc/paper_files/paper/2017/hash/e6acf4b0f69f6f6e60e9a815938aa1ff-Abstract.html> (Year: 2017).*

Song, J., et al, Understanding the Limitations of Variational Mutual Information Estimators, [received on Jul. 14, 2023]. Retrieved from Internet:<https://arxiv.org/abs/1910.06222> (Year: 2019).*

Jeong, J., The Most Intuitive and Easiest Guide for Convolutional Neural Network, [received Aug. 13, 2024]. Retrieved from Internet :<https://towardsdatascience.com/the-most-intuitive-and-easiest-guide-for-convolutional-neural-network-3607be47480> (Year: 2019).*

Dehaene et al., "Core Knowledge of Geometry in an Amazonian Indigene Group," Science Magazine, 2006, pp. 381-384, http://science.sciencemag.org/.

Lovett et al., "A Computational Model of the Visual Oddity Task," In Proceedings of the Annual Meeting of the Cognitive Science Society, vol. 30, 2008, 6 pages.

Santoro et al., "A simple neural network module for relational reasoning," In Advances in Neural Information Processing Systems, June 5, 20217, pp. 4967-4976.

Hudson et al., "Learning by Abstraction: The Neural State Machine," Paper, Jul. 15, 2019, 17 pages.

Hill et al., "Learning to Make Analogies By Contrasting Abstract Relational Structure," Published as a conference paper at ICLR 2019, Jan. 31, 2019, 18 pages.

Tishby et al., "The information bottleneck method," Sep. 30, 1999, 16 pages, http://arxiv.org/abs/physics/0004057v1.

Alemi et al., "Deep Variational Information Bottleneck," Published as a conference paper at ICLR 2017, Jul. 17, 2017, 19 pages, arXiv:1612.00410v5 [cs.LG] Jul. 17, 2017.

Belghazi et al., "Mutual Information Neural Estimation," Jun. 7, 2018, 18 pages, contribuarXiv:1801.04062v4 [cs.LG] Jun. 7, 2018.

Dai et al., "Compressing Neural Networks using the Variational Information Bottleneck," Apr. 19, 2018, 27 pages, arXiv:1802.10399v3 [cs.CV] Apr. 19, 2018.

Sankaranarayanan et al., "Regularizing Deep Networks Using Efficient Layerwise Adversarial Training," The Thirty-Second AAAI Conference on Artificial Intelligence (AAAI-18), 2018, 8 pages.

Barrett et al., "Measuring abstract reasoning in neural networks," Proceedings of the 35th International Conference on Machine Learning, Stockholm, Sweden, PMLR 80, 2018, Copyright 2018, 10 pages.

Shwartz-Ziv et al., "Opening the Black Box of Deep Neural Networks via Information", arXiv:1703.00810v3 [cs.LG] Apr. 29, 2017, 19 pages.

Search & Examination Report dated Mar. 1, 2022 from corresponding GB Application No. GB2113291.5 filed Sep. 17, 2021.

Japan Patent Office, "Notice of Reasons for Refusal," Dec. 24, 2024, 7 Pages, JP Application No. 2021-158545.

Intellectual Property Office, Patents Act 1977: Examination Report under Section 18(3), May 19, 2025, 08 Pages, GB Application No. 2113291.5.

The State Intellectual Property Office of People's Republic of China, "Second Office Action", Aug. 11, 2025, 10 Pages, CN Application No. 202111098234.0.

* cited by examiner

FIG. 2A    Quadrilateral

10a

FIG. 2B    Convex shape

10b

FIG. 2C    Rotation

10c

FIG. 2D    Equilateral
triangle

10d

NEURAL NETWORK SYSTEMS FOR ABSTRACT REASONING

BACKGROUND

The disclosure relates in general to the field of computer-implemented methods and systems for solving cognitive tasks that require learning abstract properties. In particular, the disclosure is directed to methods relying on coupled neural networks for generating embeddings that capture relational properties of pairs of input datasets (e.g., frames), wherein such datasets characterize the abstract properties to be learned. The neural networks in some embodiments may advantageously be regularized using a mutual information-based regularizer.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these new capabilities is machine learning. Machine learning mostly relies on artificial neural networks (ANNs), which generally refer to computational models inspired by biological neural networks in human or animal brains. Such systems progressively and autonomously typically learn tasks by way of examples; they have successfully been applied to speech recognition, text processing, and computer vision, among many other tasks.

Many types of ANNs are known, starting with feedforward neural networks (FFNNs), such as multilayer perceptrons, deep neural networks (DNNs), and convolutional neural networks (CNNs). ANNs are typically implemented in software; the vast majority of implementations of ANNs concerns software implementation. However, an ANN may also be implemented in hardware, e.g., as a resistive processing unit or an optical neuromorphic system.

The visual oddity task generally refers to a set of tasks designed to test basic concepts of geometry such as points, lines, parallelism, and symmetry. It was first introduced as part of a neuroscience experiment to test knowledge of conceptual principles of geometry. Each task contains six frames, five of which include the geometrical concept being tested. One of the frames violates the geometrical concept and is called the oddity. The goal of the task is to classify which of the six frames is the oddity.

SUMMARY

According to a first aspect, a computer-implemented method of solving a cognitive task that requires learning abstract properties. The method first comprises accessing datasets (e.g., image frames) that characterize the abstract properties. The accessed datasets are then input into a first neural network (e.g., a CNN), which is accordingly executed to generate first embeddings. Next, pairs of the first embeddings generated are formed, which correspond to pairs of the datasets. Data corresponding to the pairs formed (e.g., data obtained by concatenating the pairs of first embeddings) are then inputted into a second neural network, which is executed to generate second embeddings. The latter capture relational properties of the pairs of the datasets. A third neural network is subsequently executed, based on the second embeddings generated, to obtain output values that are typically interpretable as distances or similarities between the accessed datasets. Each of the second neural network and the third neural network may be a fully-connected neural network. Finally, one or more abstract properties of the datasets are learned based on the output values obtained, in order to solve the cognitive task.

In some embodiments, the method further comprises regularizing at least one of the first neural network and the second neural network using a mutual information-based regularizer, e.g., by applying a regularization term that is determined by minimizing a mutual-information-based function, for example according to a variational approximation to an information bottleneck function.

In some embodiments, the accessed datasets respectively correspond to frames characterizing the abstract properties and the cognitive task is a visual oddity task, whereby one of the frames accessed represents an oddity.

In some embodiments, each of the first, the second, and the third neural networks is executed based on parameters as learned during one or more previous phases, while solving one or more previous, different cognitive tasks.

According to another aspect, a computerized system is provided for solving a cognitive task that includes learning abstract properties, consistently with the present methods. In operation, the system is adapted to run an input unit, a neural network module, and an output unit. The input unit is adapted to access datasets characterizing the abstract properties. The neural network module is connected to the input unit. The module comprises a first neural network, a structural operation unit, a second neural network, and a third neural network. The first neural network is configured to generate first embeddings, upon execution based on datasets as accessed by the input unit. The structural operation unit is configured to form pairs of the first embeddings generated by the first neural network, the pairs formed corresponding to pairs of said datasets. The second neural network is configured to generate second embeddings that capture relational properties of the pairs of the datasets, upon execution based on data corresponding to pairs as formed by the structural operation unit, in operation. The third neural network is configured to produce output values (e.g., interpretable as distances or similarities between the accessed datasets), upon execution based on second embeddings as generated by the second neural network. Finally, the output unit is connected to the neural network module and configured to learn one or more abstract properties of the datasets based on output values as obtained from the third neural network, to solve the cognitive task.

According to another aspect, a computer program product (again for solving a cognitive task that includes learning abstract properties). The computer program product comprises a computer readable storage medium having program instructions embodied therewith, wherein the program instructions are executable by one or more processors to cause to implement operations according to the present methods.

Computerized systems, methods, and computer program products embodying the present disclosure will now be described, by way of non-limiting examples, and in reference to the accompanying drawings.

BRIEF DESCRIPTION THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
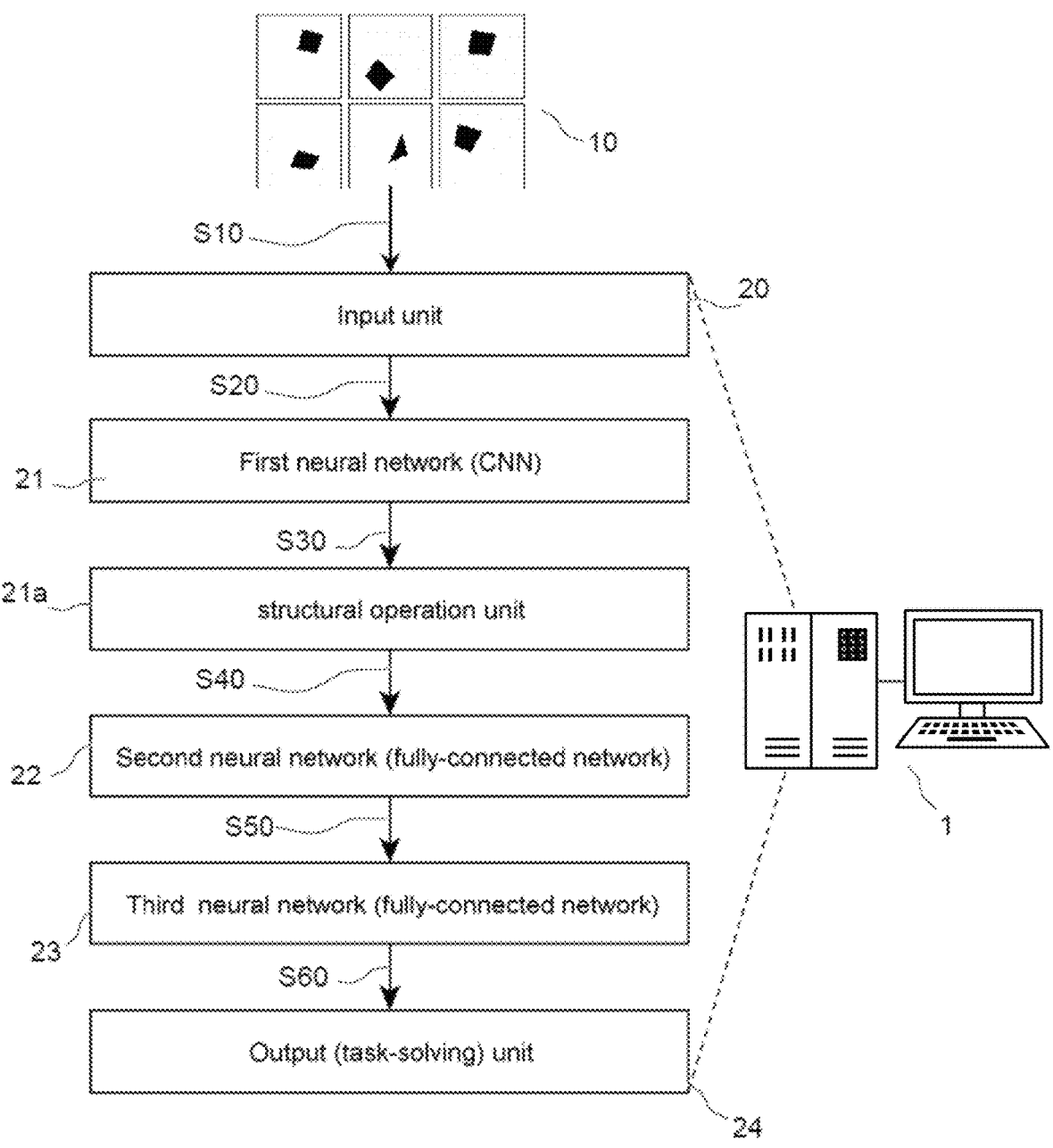
FIG. 1 is a flowchart illustrating high-level components of a computerized system according to embodiments, as well as operations of a method of operating this system to solve a cognitive task, as in embodiments.
Figure 3:
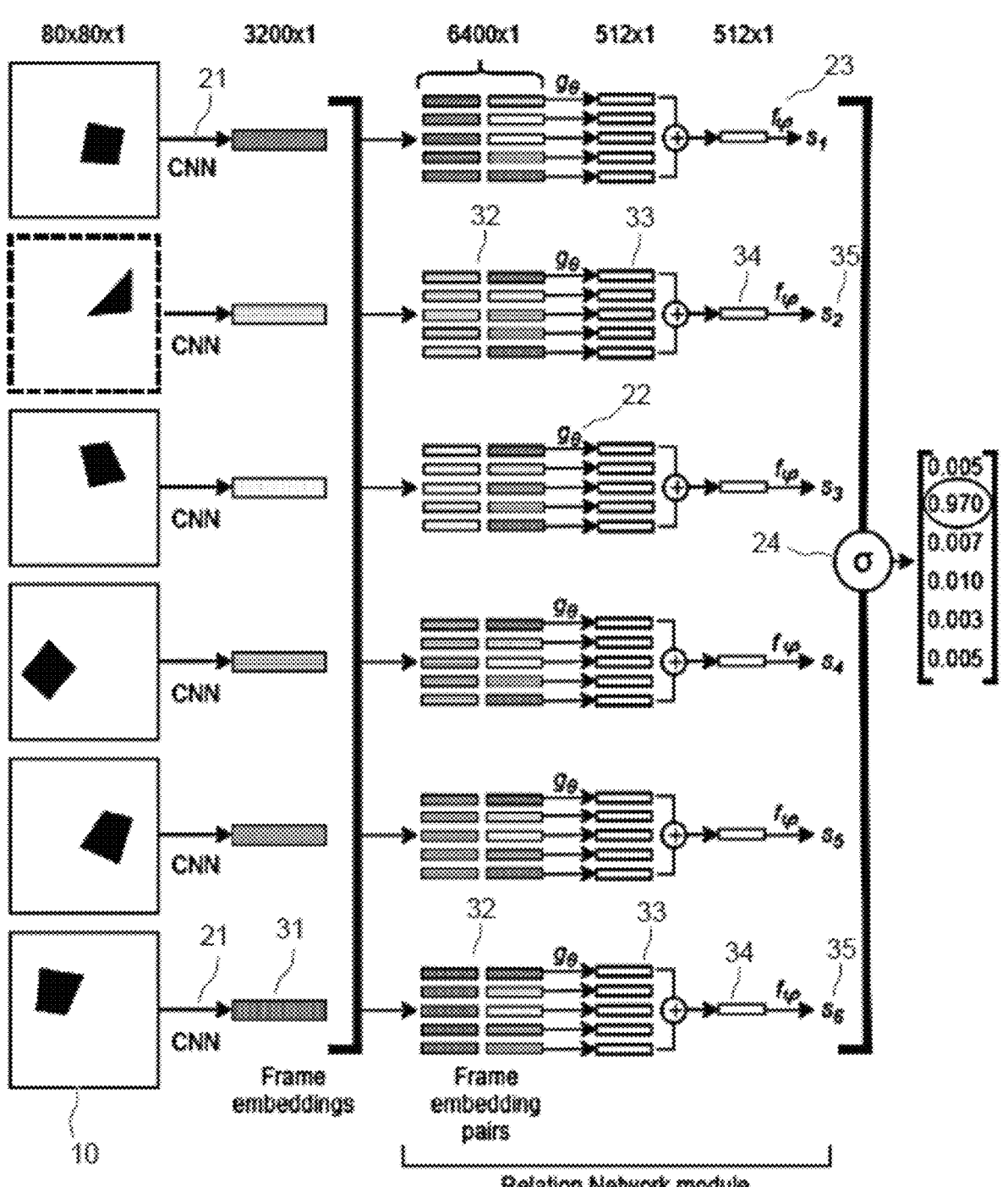
Figure 4:
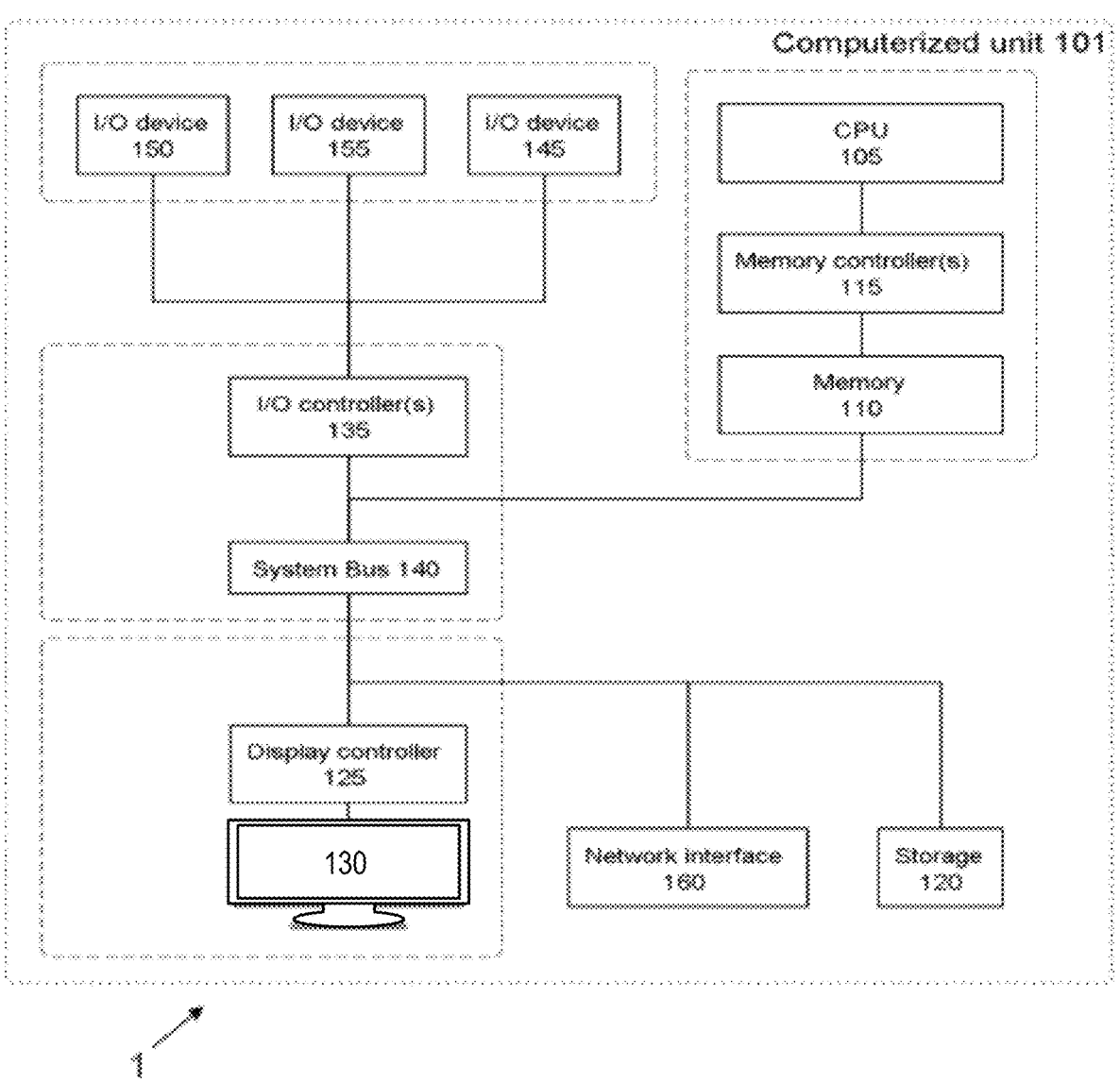

FIG. 3 is a diagram schematically illustrating inputs to and outputs obtained from neural networks of a system such as depicted in FIG. 1, and how the final outputs can be combined to solve a visual oddity task, as in embodiments; and FIG. 4 schematically represents a general-purpose computerized system, suited for implementing one or more method operations as involved in embodiments of the disclosure.

The accompanying drawings show simplified representations of computerized systems, or parts thereof, as involved in embodiments. Similar or functionally similar elements in the figures have been allocated the same numeral references, unless otherwise indicated.

DETAILED DESCRIPTION

The present disclosure describes solutions to visual oddity tasks or, more generally, cognitive tasks requiring the formation of analogies.

An ANN may generally include a set of connected units or nodes, which compare to biological neurons in animal brains and are therefore called artificial neurons. Signals may be transmitted along connections (also called edges) between artificial neurons, similarly to synapses. Taken together, an artificial neuron that receives a signal may processes it and then may signal the connected neurons.

Connection weights (also called synaptic weights) may be associated with the connections and such weights may adjust as learning proceeds. Each neuron may have several inputs and a connection weight may be attributed to each input (the weight of that specific connection). The connection weights may be learned by the training algorithm during a training phase and thereby updated. The learning process may be iterative: data cases may be presented to the network, typically one at a time, and the weights associated with the input values may be adjusted at each time step.

Figure 2:
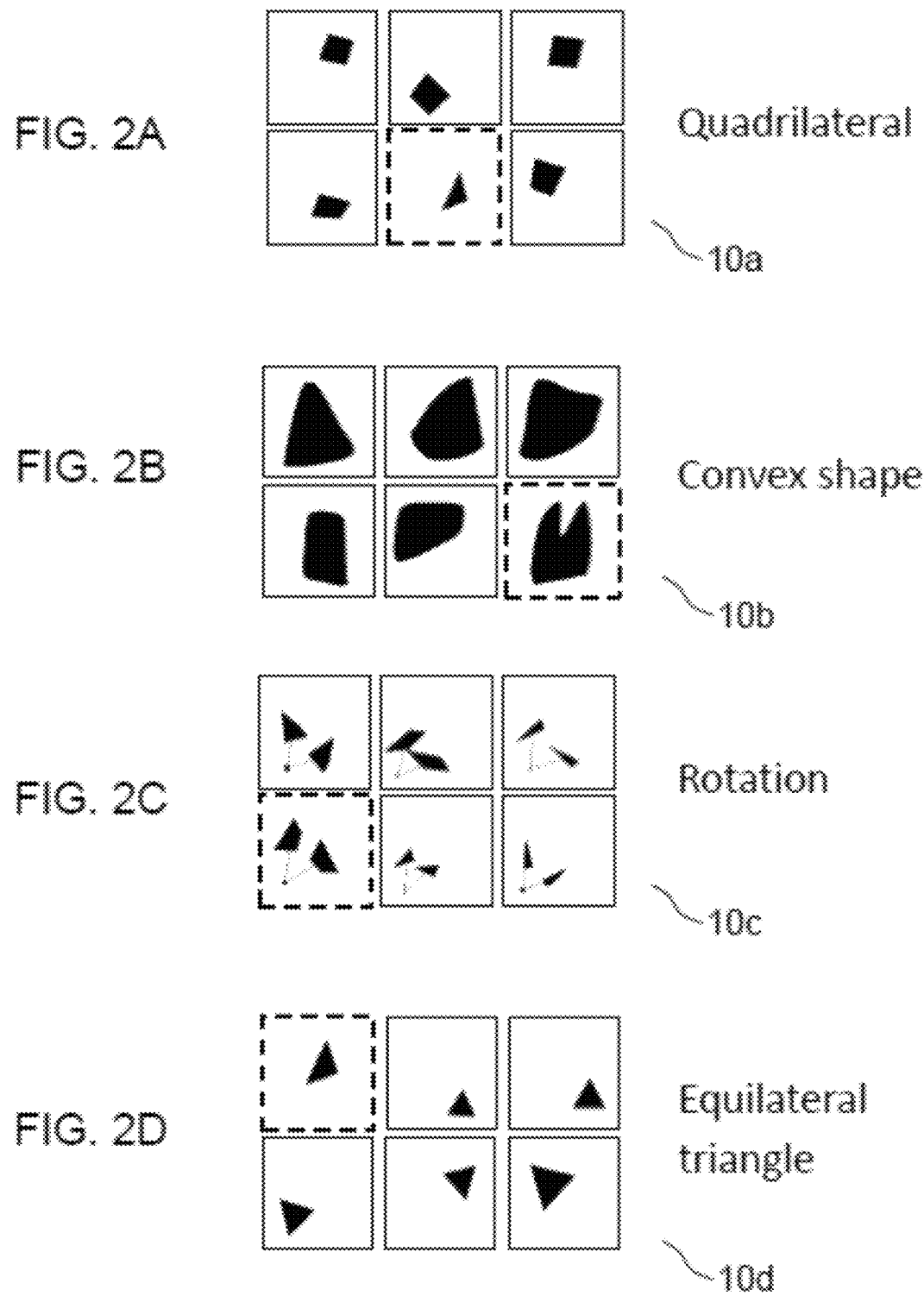
FIGS. 2A to 2D illustrate different sets of frames (i.e., images) that can be used as inputs to a neural network module of a system such as depicted in FIG. 1 to solve visual oddity tasks, as in embodiments.

In reference to FIGS. 1 to 3, an aspect of the disclosure is described which concerns a computer-implemented method of solving a cognitive task that requires learning abstract properties. Note, the present method and its variants are collectively referred to as the "present methods." All references Sij refer to the methods operations depicted in FIGS. 1 and 3, while numeral references refer to components of the system 1 and digital objects consumed or produced by it.

As illustrated in FIG. 1, the method may first include accessing S10 datasets 10. The datasets 10 may, for instance, include frames (e.g., images). More generally, the datasets may include datafiles or data that characterize the abstract properties to be learned, in order to solve a given cognitive task. In the following, however, the datasets 10 are assumed to be frames such as those depicted in FIGS. 2A to 2D, for the sake of illustration.

The accessed frames 10 may be inputted S20 into a first neural network 21, which may be a CNN. This network may be executed based on the input frames 10, in order to generate S30 first embeddings 31. The first embeddings 31 may be outputs from the first neural network 21. Such embeddings may normally feature vectors, e.g., one-dimensional (1D) arrays of numerical values.

Next, pairs 32 of the first embeddings 31 may be formed S40. The pairs 32 of embeddings may also correspond to pairs of frames 10. This task may be performed by a structural operation unit 21a, forming part of a neural network module 21-23 that implements a pipeline of three neural networks, as discussed below. The pairs 32 may simply be formed S40 by concatenating data corresponding to embeddings 31 of each pair e.g., data corresponding to the formed pairs may include concatenated values that eventually form a single vector 32 for each pair of embeddings 31. Note, the pairs 32 of embeddings 31 depicted in FIG. 3 may thus consist, each, of a single array.

The data corresponding to the formed pairs 32 may then be inputted S40 into a second neural network 22, which may be a fully-connected network. As said, the input data may simply consist of concatenated data of the paired embeddings 31, such that one-dimensional arrays of data may be inputted S40 to the second network 22. The network 22 may then be executed based on such data in order to generate S50 second embeddings 33, 34. The second embeddings 33, 34 may be outputs from the second neural network 22, which capture relational properties of the pairs of the frames 10.

Next, a third neural network 23 may be executed, based on the second embeddings 33, 34. The direct outputs 33 from the network 22 may be subject to some mathematical operation, yielding transformed data 34, prior to being fed S50 into the third network 23. In some embodiments, all outputs 33 from the second neural network 22 that correspond to a same frame may be summed, prior to being inputted S50 in the third neural network 23, for execution thereof. The third network 23 too may be a fully-connected network. The execution of the third network 23 may provide S60 output values 35, which can typically be interpreted as distances or similarities between the accessed frames 10.

Next, one or more abstract properties of the frames 10 may be learned based on the output values 35 obtained at operation S60, to solve the cognitive task. The cognitive task may, for instance, be a visual oddity task, whereby one of the frames 10 accessed at operation S10 represents an oddity, when compared to other frames, see, e.g., FIGS. 2A to 2D. In that case, learning abstract properties of the frames (based on the output values 35 obtained at operation S60) makes it possible to solve the cognitive task by discriminating one of the input frames based on the properties determined for each frame.

Beyond visual oddity tasks and other visual tasks, embodiments of the disclosure may allow solutions to certain cognitive tasks, which can be characterized by input datasets 10, to be efficiently solved by a relation network formed by the second network 22 and the third neural network 23. The idea behind these embodiments is to first compute embeddings 31 from the input datasets 10 and then form pairs 32 of embeddings, to obtain data 32 (e.g., concatenated vectors) that may be fed into the second neural network 22. This way, second embeddings 33, 34 may be generated, which may capture relational properties of the pairs of frames 10. Using a network pipeline 22, 23 designed for dealing with such relational properties, data 34 obtained from the second embeddings 33 may then be fed into the third network 23 to obtain outputs 35, which can simply be gauged to learn the desired abstract properties and thereby solve the cognitive task, as discussed later in more detail.

In some embodiments, the method may further include regularizing at least one (possibly each) of the first neural network 21 and the second neural network 22. Network regularization may be performed using a mutual information-based regularizer. Mutual information generally refers to a measure of the mutual dependence of two random variables and, in essence, may be used to measure the relationship between such variables. Mutual information can be regarded as the reduction in uncertainty in a random variable given knowledge available about the other variable. It may be measured in bits, also called Shannons. In the present context, mutual information may include information between hidden layers and the inputs and outputs of the neural networks.

In some embodiments, regularization may be achieved by adopting mutual information estimation as an additional term in the loss function characteristic of the network. The regularization term may be added as an additional loss contribution to the overall loss function along with cross-entropy. Tests performed by the authors of the present disclosure have shown that such a regularization may stabilize the test accuracy and may significantly reduce the variance. A comparison of accuracies achieved on individual tasks indicates that the network pipeline 21-23 may achieve overall performance on the visual oddity tasks that is substantially above human accuracy when enhanced by a mutual-information-based regularizer.

The regularization term may be determined by minimizing a mutual-information-based function in some embodiments. For example, the regularization term may be determined according to a variational approximation to the known Information Bottleneck (TB) method.

The goal of the IB method is to find a maximally compressed representation of an input random variable, X, which may obtained as a function of a relevant random variable, Y, such that it preserves as much information as possible on the relevant random variable, Y. A known alternative mutual information estimation method in neural networks, which is a variational approximation to the IB method, is called the Variational Information Bottleneck (VIB), which can be exploited in the present context. The VIB method can be applied to multiple layers of a convolutional neural network for network compression: The approximation of the mutual information between consecutive layers can be added as part of the objective function as a regularizer.

For example, a VIB-based regularizer may be added to the convolutional layers of the convolutional neural network and the second neural network 22 (e.g., the four fully-connected layers constituting it). A VIB-based regularizer may both improve and stabilize the accuracy obtained by the network structure, in particular for visual oddity tasks.

As evoked earlier, the first network may be a CNN, followed by fully-connected layers up to the final output. One feature and advantage of a CNN is its benefits for sensory image data. In some embodiments, the first network 21 is a CNN, which may include four, five, or more layers. The second network 22 and/or the third network 23, in turn, may be a fully-connected network. The network 22 may, for example, include four layers, while the third neural network may include three layers. The four layers of the second network may, for instance, include 512 neurons each, while the three layers of the third network may for example include 256, 256, and 1 neuron, respectively. More generally, the successive networks may be designed to accommodate successively compressed data (e.g., from the input datasets 10 to first embeddings 31 to second embeddings 33, 34 to the final outputs 35).

The second and third networks 22, 23 may be implemented as a relation network module, which forms part of an overall network module 21-23, as later described in reference to another aspect of the disclosure.

In a first class of embodiments, each initial image frame 10 may be input S20 into a four-layer CNN 21. Each convolutional layer may, for example, have 32 filters of kernel size 5×5. The convolved output S30 from the convolutional neural network for each image may then be concatenated S40 channel-wise and thereby flattened into a vector (i.e., a one-dimensional array). The flattened output may be input S40 into a four-layer fully-connected network 22.

In some of this first class of embodiments, batch-normalization may be used for all convolutional layers. Furthermore, dropout regularization may be applied after all convolutional layers that do not precede a pooling layer (with, e.g., a dropout rate of 0.3) and after the first fully-connected layer (with, e.g., a dropout rate of 0.5) of the second network 22

As a whole, the neural network module 21-23 implementing the three networks 21-23 may be configured as a relation network for solving visual oddity tasks. Such a network may advantageously be designed to extend the known Wild Relation Network (WReN), which was introduced to solve Raven's Progressive Matrices RPMs. However, the WReN model directly computes pair-wise relations of the RPM panels, i.e., it determines pairwise relations between context panels and choice panels. For cognitive tasks such as visual oddity tasks, there are no context panels or choice panels as all frames can potentially be classified as the oddity.

In a second class of embodiments, each frame 10 of a visual oddity task may be input S20 into a 5-layer CNN 21, which may output a corresponding frame embedding 31. As illustrated in FIG. 3, this task may, for example, include identifying a non-quadrilateral from a given set of six frames, see also FIG. 2A. E.g., for every frame $k \in [1, 2, \ldots, 6]$, the CNN 21 may output a frame embedding $y_k$, denoted by numeral reference 31 in FIG. 3. Then, for each frame embedding $y_k$, pairs 32 of embeddings 31 may be generated S40 by ordered concatenation with the other five frame embeddings, as depicted in FIG. 3 using distinct patterned shapes 31, 32. As an illustrative example, for the first frame (frame 1), the pairs needed are $\{y_1, y_2\}$, $\{y_1, y_3\}$, ..., and $\{y_1, y_6\}$. A total of 30 pairs 32 may thus be generated. Each pair 32 may then be fed S40 to the second network 22. Put differently, the architecture of FIG. 3 assumes that each pair 32 may be used as an argument of a function go that is parameterized by the neural network 22, and this for each frame. The outputs 33 of go that correspond to a given frame may be summed up, yielding arrays of data 34; the same type of computation may be performed for each frame. The vector of summed outputs 34 corresponding to each frame 10 may then be fed S50 into the third neural network 23 (e.g., it is used as argument of a second function, $f_\varphi$, parameterized by the network 23) to calculate a final score 35 and then identify the oddity, based upon all the final scores obtained, as illustrated in FIG. 3.

In embodiments, the learning of the abstract properties may simply be completed by applying a softmax function across all output values 35 obtained from $f_\varphi$, to determine a probability of each frame to be the oddity, as further assumed in FIG. 3, where the oddity corresponds to the maximum value 0.970 in this illustrative example.

Other possible visual oddity tasks may, for example, include distinguishing a non-convex shape from convex shapes (FIG. 2B), identifying a pair of shapes that cannot be obtained by rotation, among other pairs that can (FIG. 2C), or distinguishing a non-equilateral triangle from equilateral triangles (FIG. 2D). Each oddity frame is bordered by a dashed line in the datasets 10a-10d shown in FIGS. 2A-2D.

The networks 21, 22, 23 may be computed for training or inference purposes, and may be trained prior to performing inferences. The network parameters learned for given tasks may possibly be transferred to further tasks. In particular, in the present methods, each of the first neural network 21, the second neural network 22, and the third neural network 23 may be executed based on network parameters as learned upon executing the same networks for solving one or more previous, different cognitive tasks. The transfer learning was notably investigated for visual oddity tasks, with a limited amount of data provided per task e.g., by initially training on 44 out of 45 tasks, the mean test accuracy of the model, trained on a small number of samples of previously unseen tasks, significantly increases. For instance, if only 50 training samples per task are provided, the accuracy of the transfer learning model increases from 45.3% to 73.8%.

The above embodiments have been succinctly described in reference to the accompanying drawings and may accommodate a number of variants. Several combinations of the above features may be contemplated.

In these embodiments, neural network architectures can be leveraged to solve cognitive tasks, which can additionally benefit from network regularization, especially for a large number of training epochs, by adopting mutual information estimates as an additional term in the loss function characteristic of the network. Such regularization may provide benefit by stabilizing the test accuracy and significantly reducing its variance. The neural network structure of some embodiments can further be enhanced by elements mediated by the estimation of mutual information, for the solution of abstract reasoning challenges. Supervised learning techniques may be used to solve visual oddity tasks and achieve 96.5% mean task accuracy. With regularization based on mutual information estimation, the accuracy can further be improved to 97.1%. Finally, the proposed models can benefit from and/or enable transfer learning.

Next, according to another aspect, embodiments of the disclosure can be embodied as a computerized system 1, generally designed for solving a cognitive task that may include learning abstract properties. Operational aspects of this system 1 have already been implicitly described in reference to the present methods. The system 1 is only briefly described in the following.

Consistent with some embodiments, the system 1 may be equipped with processor(s) and memory, the latter including computerized methods that allow the system 1 to form, in operation, an input unit 20, a neural network module 21-23, and an output unit 24, see FIGS. 1 and 4.

The input unit 20 may be designed to access frames 10 characterizing the abstract properties. The neural network module 21-23 may be connected to the input unit 20. The neural network module 21-23 may include a first neural network 21, a structural operation unit 21a, a second neural network 22, and a third neural network 23, as previously described.

In more detail, the first neural network 21 may be configured to generate first embeddings 31, upon execution based on frames 10 as accessed by the input unit 20. The structural operation unit 21a may be designed to form pairs 32 of the first embeddings 31 generated by the first neural network 21. The pairs 32 formed may correspond to pairs of the frames 10. The second neural network 22 may be configured to generate second embeddings 33, 34 that may capture relational properties of the pairs 32 of the frames 10, upon execution based on data corresponding to pairs 32 as formed by the structural operation unit 21a. The third neural network 23 may be designed to produce output values 35 (which may be interpretable as distances or similarities between the accessed frames 10), upon execution based on second embeddings 33, 34 as generated by the second neural network 22. Finally, the output unit 24 may be connected to the neural network module 21-23 and may be configured to learn one or more abstract properties of the frames 10 based on output values 35 as may be obtained from the third neural network 23, to solve the cognitive task.

In embodiments, the system 1 may be further operable to form the first neural network 21 as a CNN, while the second 22 and/or the third neural network 23 may be formed as a fully-connected neural network. And as explained earlier, the neural network module 21-23 may further be configured to regularize one or each of the first neural network 21 and the second neural network 22 using a mutual information-based regularizer, e.g., by applying a regularization term determined according to the VIB method.

Computerized systems can be suitably designed for implementing embodiments of the present disclosure as described herein. In that respect, it can be appreciated that some embodiments described herein are largely non-interactive and automated. However, the methods described herein can also be implemented either in an interactive, partly-interactive or non-interactive system in some embodiments. Additionally, the methods described herein can be implemented in software (e.g., firmware), general-purpose hardware, special-purpose hardware (e.g., graphical processing units), or a combination thereof. In some embodiments, the methods described herein can be implemented in software, as an executable program, the latter executed by suitable digital processing devices. More generally, embodiments of the present disclosure can be implemented using general-purpose digital computers, such as personal computers, workstations, etc., are used.

For instance, the system 1 depicted in FIG. 4 schematically represents a computerized unit 101, e.g., a general-purpose computer. In some embodiments, in terms of hardware architecture, as shown in FIG. 4, the unit 101 may include a processor 105, a memory 110 coupled to a memory controller 115, and one or more input and/or output (I/O) devices 145, 150, 155 (or peripherals) that may be communicatively coupled via a local input/output controller 135. The input/output controller 135 may be, but is not limited to, one or more buses or other wired or wireless connections. The input/output controller 135 may also have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 in some embodiments may be a hardware device for executing software, particularly that stored in memory 110. The processor 105 may be any custom made or commercially available processor, a central processing unit (CPU), an auxiliary processor among several processors associated with the computer 101, a semiconductor-based microprocessor (in the form of a microchip or chip set), or generally any device for executing software instructions.

The memory 110 in some embodiments may include any one or combination of volatile memory elements (e.g., random access memory) and nonvolatile memory elements. Moreover, the memory 110 may incorporate electronic, magnetic, optical, and/or other types of storage media. Note that the memory 110 may have a distributed architecture, where various components may be situated remote from one another, but can be accessed by the processor 105.

The software in memory 110 may include one or more separate programs, each of which comprises an ordered listing of executable program instructions for implementing logical functions. In the example of FIG. 4, the software in the memory 110 includes some or all of the methods described herein in accordance with some embodiments and a suitable operating system (OS) 111. The OS 111 may essentially control the execution of other computer programs and may provide scheduling, input-output control, file and data management, memory management, and communication control and related services.

The methods described herein may be in the form of a source program, executable program (object code), script, or any other entity comprising a set of program instructions to be performed. When in a source program form, then the program may be translated via a compiler, assembler, interpreter, or the like, which may or may not be also included within the memory 110, so as to operate properly in connection with the OS 111. Furthermore, the methods may be written as an object-oriented programming language, which has classes of data and methods, or a procedure-oriented programming language, which has routines, subroutines, and/or functions.

Possibly, a conventional keyboard 150 and mouse 155 may be coupled to the input/output controller 135. Other I/O devices 145-155 may include other hardware devices, such as a camera, microphone, printer, etc.

In addition, the I/O devices 145-155 may further include devices that communicate both inputs and outputs. The system 100 can further include a display controller 125 coupled to a display 130. In some embodiments, the system 100 can further include a network interface or transceiver 160 for coupling to a network (not shown).

The network in some embodiments transmits and receives data between the unit 101 and external systems. The network may be implemented in a wireless fashion, e.g., using wireless protocols and technologies, such as WiFi, WiMax, etc. The network may be a fixed wireless network, a wireless local area network (LAN), a wireless wide area network (WAN), a personal area network (PAN), a virtual private network (VPN), an intranet, or other suitable network system and includes equipment for receiving and transmitting signals.

The network can also be an IP-based network for communication between the unit 101 and any external server, client and the like via a broadband connection. In some embodiments, the network may be a managed IP network administered by a service provider. Moreover, the network may be a packet-switched network such as a LAN, WAN, Internet network, etc.

If the unit 101 is a personal computer (PC), workstation, intelligent device or the like, the software in the memory 110 may further include a basic input output system (BIOS). The BIOS may be stored in a Read-Only Memory (ROM) structure so that the BIOS can be executed when the computer 101 is activated.

When the unit 101 is in operation, the processor 105 may be configured to execute program instructions stored within the memory 110, to communicate data to and from the memory 110, and to generally control operations of the computer 101 pursuant to the software and the OS 111. The methods described herein and the OS 111, in whole or in part, may be read by the processor 105, typically buffered within the processor 105, and then executed. When the methods described herein are implemented in software, the methods can be stored on any computer readable medium, such as storage 120, for use by or in connection with any computer related system or method.

Aspects of the disclosure may also be embodied as a computer program product. Generally speaking, the computer program product may comprise a computer readable storage medium having program instructions embodied thereon, where the program instructions may be executable by one or more processors, to cause a computer system 1 to implement operations as described earlier, e.g., access frames 10, execute a first neural network 21 to generate first embeddings 31 based on such input frames, form pairs 32 of the resulting embeddings 31, input corresponding data into a second neural network 22 and execute the latter to generate second embeddings 33, 34. The embeddings 33, 34 may capture relational properties of the pairs 32 of the frames 10. Finally, a third neural network 23 may be computed based on the second embeddings 33, 34 to obtain output values 35, based on which one or more abstract properties of the frames 10 can be learned to solve the cognitive task.

Thus, aspects of the disclosure may include a system, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store program instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid-state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, but is not intended to otherwise limit the disclosure.

The program instructions and data stored on a computer readable storage medium in non-transitory form may further be transmitted by transmission media or signals such as electrical, electromagnetic, or digital signals, which may be conveyed via a communication medium such as a network and/or a wireless link. The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which execute via the processor of the computer or other programmable data processing apparatus, create ways for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

While the present disclosure has been described with reference to a limited number of embodiments, variants and the accompanying drawings, it will be understood by those skilled in the art that various changes may be made and equivalents may be substituted without departing from the scope of the present disclosure. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims. In addition, many other variants than explicitly touched above can be contemplated.

What is claimed is:

1. A computer-implemented method of solving a cognitive task that includes learning abstract properties, the method comprising, using a processor:

accessing datasets from an input unit, the datasets characterizing the abstract properties;

inputting the accessed datasets into a first neural network of a neural network module; executing the first neural network to generate first embeddings for frames of image frames in the accessed datasets, wherein the first embeddings are one dimensional arrays of numerical arrays of numerical values;

forming pairs of the first embeddings generated, wherein both first embeddings in the pairs formed correspond to pairs of frames of image frames in the accessed datasets;

inputting data corresponding to the formed pairs into a second neural network of the neural network module; executing the second neural network to generate second embeddings that capture relational properties of frames for the formed pairs;

executing a third neural network of the neural network module based on the second embeddings to obtain output values;

determining a probability that each output value of the third neural network comprises one or more abstract properties of the datasets;

outputting a most probable solution to a cognitive task using the determined probabilities and training network parameters for the first neural network, the second neural network, and the third neural network in the neural network module using the solution to the cognitive task, wherein the first neural network is a convolutional neural network; wherein each of the second neural network and the third neural network is a fully-connected neural network; further comprising regularizing at least one of the first neural network and the second neural network using a mutual-information-based regularizer, wherein using the mutual-information-based regularizer comprises applying a regularization term that is determined by minimizing a mutual-information-based function.

2. The method according to claim 1, wherein the regularization term applied is determined according to a variational approximation to an information bottleneck function.

* * * * *